UNITED STATES PATENT OFFICE.

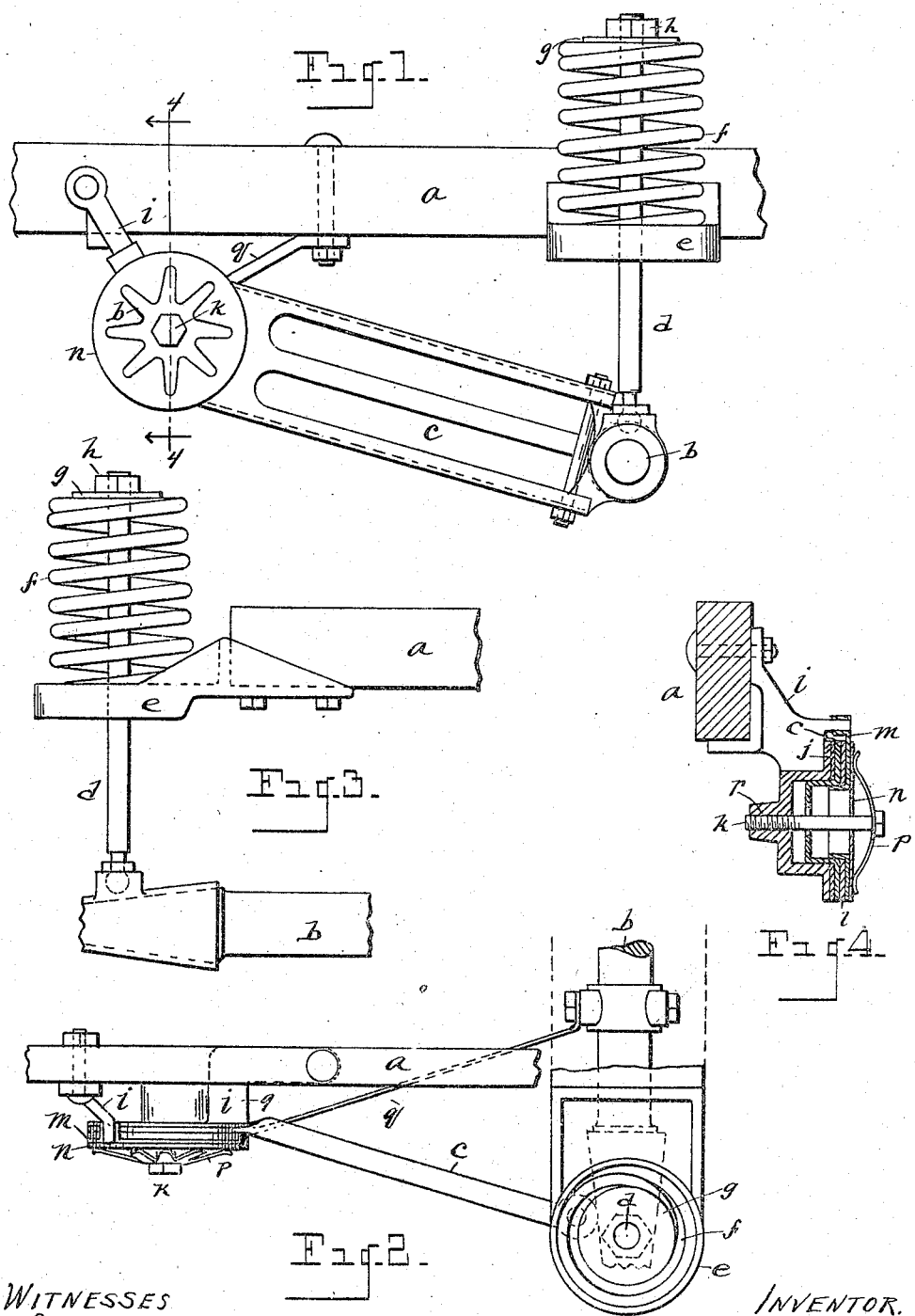
A. P. BRUSH.
SPRING SUSPENSION.
APPLICATION FILED OCT. 6, 1906.
923,765.
Patented June 1, 1909.

ALANSON P. BRUSH, OF DETROIT, MICHIGAN.

SPRING SUSPENSION.

No. 923,765.   Specification of Letters Patent.   Patented June 1, 1909.

Application filed October 6, 1906. Serial No. 337,772.

*To all whom it may concern:*

Be it known that I, ALANSON P. BRUSH, a citizen of the United States, residing at Detroit, county of Wayne, State of Michigan, have invented a certain new and useful Improvement in Spring Suspension, of which the following is a specification, reference being had to the accompanying drawings, which form a part of this specification.

My invention is designed to provide a novel spring suspension mechanism adapted for a variety of uses, the same being of superior construction and utility, and it consists of the mechanism hereinafter described and claimed and illustrated in the accompanying drawings, in which, Figure 1 is a view in side elevation. Fig. 2 is a plan view. Fig. 3 is a rear elevation. Fig. 4 is a view in section on the line 4—4, Fig. 1.

The aim of my device is to provide an improved spring suspension mechanism for suspending, for example, a supporting frame work indicated at $a$, in the drawings. I have shown my improved device applied to a vehicle in which $b$ represents an axle, and $c$ a radius rod engaged therewith. The axle is shown suspended upon a rod $d$, said rod passed through a bracket $e$ attached to the supporting frame work, upon which bracket is located a coiled spring $f$ the rod $d$ at its upper end being engaged with the upper end of the spring in any suitable manner, as by a washer $g$ and nut $h$. The forward end of the radius rod is connected with a bracket $i$ engaged with the frame, the adjacent end of the radius rod $c$ being formed with a hub to journal in the bracket $i$, as indicated more particularly in Fig. 4, the hub of the radius rod being engaged in the correspondingly formed portion of the bracket $i$, a washer $j$ intervening. The radius rod may be pivoted on the bracket $i$ in any suitable manner. The bolt $k$, the friction washers $j$ and $l$, the friction plate $m$, and the spring washer $p$ form a friction device for retarding the oscillation of the radius rod about its journal on the bracket $i$. I would have it understood that I do not limit myself to any particular form of friction device, however, nor do I limit my invention to the use of any friction device, although for certain conditions a friction device is desirable. A plate $n$ forms a dust shield. A brace rod is indicated at $q$. It will be understood that the radius rod is rigidly engaged upon the axle.

It will be observed that the radius rod is arranged so as to take the torsion of the axle, allowing only a vertical movement of the axle, in other words the radius rod is so arranged as to resist any torsion of the axle caused by turning corners on the front wheels of a vehicle, and on the rear wheels by the action of a brake, or by driving mechanism. The radius rod is so arranged as to maintain the axle in position laterally or sidewise as well as longitudinally of the vehicle, allowing to the axle only the proper vertical movement. By arranging the radius rod in this manner I am enabled to use a coiled spring readily. But it is well understood that a coiled spring, under certain conditions of roads or under certain driving conditions, would have altogether too much rebound, the same having too much elasticity, but this I overcome by making the joint of the radius rod where it pivots on the frame a friction device, the same being preferably adjustable, so that any desired amount of friction may be maintained at that point by simply tightening up the bolt $k$, which has a threaded engagement in the bracket $i$, as indicated at $r$, Fig. 4. By so doing the frictional effect decreases the rebound of the spring. A coiled spring it is well understood, has more capacity in proportion to its weight than a flat spring, and I overcome its too great elasticity, under certain conditions, by the frictional arrangement of the radius rod in its jointed engagement with the frame. By the mechanism above described I am enabled to get any degree of friction desired.

It will be evident that the springs sustain the weight of the frame and pressure of vertical vibration caused by the oscillation of the radius member, said springs being arranged to expand and contract.

What I claim as my invention is:

1. A spring suspension comprising in combination a support or frame, an axle, a suspending rod supporting the axle, a coiled spring engaged upon the rod, a radius rod rigidly engaged with the axle, said radius rod having a jointed frictional engagement upon the support or frame.

2. A spring suspension device comprising a support or frame, a suspending rod engaged therewith, a coiled spring engaged upon the support or frame and exerting its tension upon said rod, an axle supported on the rod, a radius rod rigidly engaged with the axle, said radius rod having a jointed frictional engagement upon said support or frame.

3. A spring suspension comprising a support or frame, an axle, a suspending rod supporting the axle, a coiled spring engaged upon the rod, and exerting its tension upon said rod, a radius rod rigidly engaged with the axle and having a jointed frictional engagement at its opposite end with the support or frame, the radius rod arranged to take the torsion of the axle and to maintain the axle in position laterally and longitudinally, allowing only a vertical movement of the axle.

4. A spring suspension comprising in combination a support or frame, an axle, a suspending rod supporting the axle, a coiled spring engaged upon the rod, a radius rod rigidly engaged upon the axle, said radius rod having a jointed frictional engagement upon the support or frame.

5. A spring suspension comprising an axle, a frame, a suspending rod supporting the axle, a spring forming an elastic load carrying connection for the axle, a radius rod having a jointed frictional connection with the frame and journaled at its connection to the frame, said radius rod being rigidly attached to the axle and formed to resist torsion and lateral movement of the axle.

6. A spring suspension comprising in combination a frame, an axle, a suspending rod supporting the axle, a spring engaged upon the rod, a radius rod connecting the axle to the frame journaled at its connection to the frame, and provided with friction mechanism at its journaled connection to the frame.

7. A vehicle spring suspension comprising a frame, axles, yielding mechanism supporting said axles respectively, radius members rigidly attached at one extremity to each axle and jointedly attached at their opposite extremities to the frame of the vehicle, and a frictional device formed in the pivotal connection of the individual radius members to the frame, said radius members formed to prevent movement of the corresponding axle with respect to the frame in all directions except in the arc of oscillation about the jointed connection of the radius member and the frame.

8. A vehicle spring suspension comprising a frame, axles, yielding mechanism supporting said axles respectively, radius members rigidly attached at one extremity to each axle and jointedly attached at their opposite extremities to the frame of the vehicle and a frictional device formed in the pivotal connection of the individual radius members to the frame, said yielding mechanism comprising helical springs to control the movement of the corresponding axle with respect to the frame in its arc of action.

9. A vehicle spring suspension comprising a frame, an axle, yielding mechanism supporting the ends of said axle respectively, a radius member rigidly attached at one extremity to the axle and jointedly attached at its opposite extremity to the frame of the vehicle, and a frictional device formed in the pivotal connection of the radius member to the frame, said yielding mechanism comprising a helical spring to control the movement of the axle with respect to the frame in the approximately vertical movement of the axle, said radius member arranged to prevent the movement of the axle with respect to the frame in all directions except in the arc of vertical oscillation of the radius member.

10. A vehicle spring suspension comprising a frame, axles, yielding mechanism supporting said axles respectively, a radius member rigidly attached at one extremity to each axle and having a frictionally jointed attachment at the opposite extremity to the frame of the vehicle and a frictional device formed in the pivotal connection of the individual radius members to the frame, said radius member formed to prevent movement of the axle with respect to the frame in all directions except the arc of the oscillation about the jointed connection of the corresponding radius member and the frame.

11. A vehicle spring suspension comprising a frame, axles, yielding mechanism supporting said axles respectively, plural radius members rigidly attached at one extremity to the axles and jointedly attached at their opposite extremities to the frame of the vehicle, and a frictional device formed in the pivotal connection of the individual radius members to the frame, said radius members formed to prevent movement of the axle with respect to the frame in all directions except the arc of oscillation about the jointed connection of the radius member and the frame.

12. A vehicle spring suspension comprising a frame, a helical spring supported upon the frame, a rod supported upon said spring, an axle suspended upon said rod, a radius member rigidly attached to the axle and jointedly attached to the frame, said radius member formed to prevent movement of the axle with respect to the frame in all directions except in the arc of oscillation about the jointed connection of the radius member and the frame.

13. A vehicle spring suspension comprising a frame, axles, yielding mechanism connected with said axles respectively, comprising helical springs located above the frame and supporting said frame, and plural vertically oscillatory radius members rigidly attached at one extremity to the corresponding axles and jointedly connected at their opposite extremities with the frame, said radius members arranged to prevent movement of the axles with respect to the frame in all directions except the arc of vertical oscillation of the radius members, said yielding mechanism sustaining the pressure of vibration.

14. A vehicle spring suspension comprising a frame, springs supported upon said frame and extending thereabove, vertically extended rods supported at their upper ends upon said springs respectively, an axle suspended upon each of said rods and vertically oscillatory radius members rigidly attached at one extremity to the corresponding axle and jointedly connected at their opposite extremities with said frame, said radius members arranged to prevent movement of the axles with respect to the frame in all directions except in the arc of vertical oscillation of the radius members.

In testimony whereof, I have signed this specification in the presence of two subscribing witnesses.

ALANSON P. BRUSH.

Witnesses:
WM. AVERY BRUCE,
N. S. WRIGHT.